(12) United States Patent
Sloop

(10) Patent No.: US 8,444,106 B1
(45) Date of Patent: May 21, 2013

(54) STAKE-MOUNTED TURKEY POT CALL HOLDER

(76) Inventor: Stephen S. Sloop, Woodbine, GA (US)

( * ) Notice: Subject to any disclaimer, the term of this patent is extended or adjusted under 35 U.S.C. 154(b) by 0 days.

(21) Appl. No.: 13/373,222

(22) Filed: Nov. 8, 2011

(51) Int. Cl.
*A45F 3/44* (2006.01)
*F16M 13/00* (2006.01)

(52) U.S. Cl.
CPC .................................. *A45F 3/44* (2013.01)
USPC ........... 248/530; 248/156; 248/545; 220/475; 446/397

(58) Field of Classification Search
CPC .......................................... A45F 3/44
USPC ............. 248/530, 545, 156, 532, 533, 146, 248/154, 159, 413, 121; 446/397; 220/475
See application file for complete search history.

(56) References Cited

U.S. PATENT DOCUMENTS

| | | | | |
|---|---|---|---|---|
| 2,313,115 | A * | 3/1943 | Allen et al. .................... | 248/156 |
| 2,318,122 | A * | 5/1943 | Williams ....................... | 220/475 |
| 3,638,802 | A * | 2/1972 | Westerfield ................ | 211/85.19 |
| 4,319,726 | A * | 3/1982 | Andersson ....................... | 248/97 |
| 4,497,077 | A * | 2/1985 | Provost ............................. | 4/628 |
| 4,741,494 | A * | 5/1988 | Voornas ........................ | 248/154 |
| 4,940,201 | A * | 7/1990 | Kurth ............................ | 248/101 |
| 5,562,521 | A * | 10/1996 | Butler et al. .................. | 446/397 |
| 6,616,504 | B1 * | 9/2003 | Forbes et al. ................. | 446/418 |
| 7,785,169 | B2 * | 8/2010 | Moss ............................. | 446/418 |
| 7,895,952 | B2 * | 3/2011 | Theinert ......................... | 108/27 |
| 7,927,172 | B1 | 4/2011 | Kirby | |
| 2006/0011789 | A1 * | 1/2006 | Bergh ........................... | 248/156 |

* cited by examiner

*Primary Examiner* — Anita M King
(74) *Attorney, Agent, or Firm* — Alfred D. Lobo

(57) ABSTRACT

A holder for the sound-box of a pot call for a wild turkey comprises a mass-producable unitary synthetic resinous trough having a generally cylindrical shape and a coaxial U-shaped channel in the trough, the channel being wide enough to snugly removably hold the sound-box. The trough is removably mounted on a vertical mounting post projecting axially, vertically from a two-piece or two-strut stake the lower end of which is pointed so that it can be pushed into the ground at height not higher than that of a hunter's fingers when he is seated. Two embodiments are provided: (i) the lower strut may be retracted fully into the upper strut; (ii) the upper end of the lower strut is slidably inserted into the lower end of the upper strut and locked in position in a T-slot.

8 Claims, 5 Drawing Sheets

STAKE-MOUNTED TURKEY POT CALL HOLDER

BACKGROUND OF THE INVENTION

1. Field of the Invention

This invention relates to a device for holding the sound-box portion of a sound generating "pot call" which utilizes a striker to mimic the cluck, yelp, putt, purr or other sounds made by a turkey. The "pot call" includes a sound-box portion and a short rod, referred to as a striker or rubbing stick, one end (the striking or rubbing end) of which is contoured, typically rounded. The sound-box portion is commonly referred to as a pot call ignoring the fact that, without the striker, the desired sounds could not be generated. Pot calls and pot call holders are currently sold by several sporting goods stores such as Primos, Cabela's, Quaker Boy, Flambeau and others.

2. Brief Description of the Prior Art

A hunter who plans to shoot a turkey, typically chooses to use a turkey decoy to draw the turkey (heard by the hunter, or suspected by the hunter to be in the immediate vicinity) to a decoy he has positioned in a chosen patch at an earlier time. Though the decoy is a molded likeness of a turkey, artfully calculated to attract another turkey, the hunter must get the attention of the wild turkey in the first place.

To do so, the pot call he uses most commonly comprises a cylindrical, rarely an ellipsoidal, sound-box and the striker. Typically, the hunter positions his turkey decoy, then secretes himself in a camouflaged shelter or under cover of a bush, in a sitting position, with his gun on his lap, or on the ground beside him. He then holds the sound-box in one hand and the striker in the other, and by contacting and rubbing the sound-box's surface with the striker with a back-and-forth motion with just the right pressure, he generates the desired sounds. The sounds generated are meant so closely to mimic the sounds which would likely have been generated by the decoy, if it were a turkey, that the wild turkey flies in to investigate what it believes to be another turkey in the fateful patch.

Upon arrival of the turkey, it is of the utmost importance that the hunter have the least possible movement before the gun is braced against the shoulder. This is not possible if both one's hands are occupied with calling in the turkey. One has to put down both the striker and the sound-box before picking up the gun. It is at least two of these movements which the device of this invention, and the many devices of the prior art, have attempted to eliminate.

To free at least one hand, namely the hand which is to lift the gun to the shoulder, hunters, over the years, have been offered a wide spectrum of holders for the sound-box, one (U.S. Pat. No. 7,353,974) of which is to be mounted on one's thigh, another (U.S. Pat. No. 7,927,172), mounted on a tree-trunk fortuitously positioned at exactly the best portion of ground on which the blind is to be deployed, and still others (U.S. Patent Application Publication No. 2007/0155282) which are to be foot-operated.

Wild turkeys are well known both, for their acute eyesight and hearing, which accounts for their skittishness. Wild turkeys also are likely to feed in the early, or, less likely, the late hours of the day. Therefore, anyone who has tried to attract a wild turkey to a decoy knows full well that the slightest unusual movement on the ground in the vicinity of the patch will spook a wild turkey. Generally, it is necessary to deploy the decoy(s) just before dawn when there is little light, with as little movement as possible, and get settled into a blind or on a stool or rounded boulder with his back resting against a tree, so as to be able to get the gun from the ground, or from one's lap to a shoulder. Again, the gun is typically set on a shooting stake adjusted for shoulder height while in a sitting position, before the hunter prepares to call the turkey into his shooting range; to call the turkey he uses his other hand to make the calls. He does this with as little unnecessary movement as possible to create as little sound as possible.

Using a pot caller or a box caller typically requires both hands and this preferred manner of using a pot call holder allows maximum control to generate a precise "live" sound desired with a chosen sound-box specifically constructed to produce that particular "live" sound when stroked or scratched with the striker, using a particular amount of force and moving the striker back and forth at a particular frequency. The precise movement required to generate a desired "live sound is famously difficult to control, because one hand must cradle the sound-box stably, preferably without the sound-box resting on the palm of the one hand, and the other hand must manipulate the striker against the surface of the sound-box, with a delicate touch, using just the right force (pressure) and frequency.

THE PROBLEM

Because prior art devices have obvious drawbacks, no single such device is known by this inventor to be sold commercially in this country. For example, the sound generated by a thigh-mounted sound-box is readily distinguishable from that of the same sound-box if held in one's hand. The simple reason is that the thigh which is in contact with the lower surface of the sound-box, distorts the frequency and amplitude of sound waves generated because the sound-box is cushioned by the thigh. As for a foot-operated device in which a pot call is mounted, even if one was to find a flat uncluttered space on a forest floor, on which space to position the foot-operated device, manipulating the striker with the required delicate touch with one's foot is all but impossible—assuming that the working of the moving parts of the device generates no sound.

The foregoing is an age-old problem which hunters have coped with ever since it was found that a wild turkey can be attracted to a decoy with an expertly operated pot call. The art has simply overlooked a simple, but unexpectedly effective solution to the problem. That solution is presented herebelow.

SUMMARY OF THE INVENTION

A simple, readily mass-produced device is provided for holding the sound-box of a pot call for a wild turkey being called by a hunter manipulating a striker on the surface of the sound-box while in a sitting position waiting for arrival of the turkey to a selected portion of ground.

The device comprises a crescent-shaped unitary trough and a sound-box of a turkey pot call removably secured to a stake one end of which is pointed so as to be manually pushed into the ground. Because the sound-box in plan view is typically cylindrical, sometimes elliptical, the trough is semi-cylindrical or semi-ellipsoidal. It is essential that the sound-box in the trough be held in a generally horizontal position, at a height, referred to as the "calling height", no higher than the hunter's fingers when he is in his chosen seated position. A two-part or two-strut stake, when assembled, presents the sound-box at the "calling height" for the hunter's fingers.

The trough has a generally unitary semi-crescent configuration within which is formed a coaxial channel having a U-shaped cross-section, extending over the entire arcuate length of the trough which has a width sufficient to snugly removably hold a sound-box having a shape conforming to that of the crescent-shaped channel, when the sound-box is inserted laterally into the channel. The sound-box is removably, snugly inserted in the semi-crescent-shaped channel, the sound-box having a conforming shape corresponding in shape to the cross-section of the channel which extends over the entire arcuate length of the trough.

To be readily transportable on a hunter's person, the stake comprises an upper strut and a lower strut detachable from the upper strut, the lower end of the lower strut having a pointed end adapted to be pushed into the ground. The upper strut, at its upper end, is provided with an upstanding vertical mounting post, projecting axially, upon which post the trough is removably mounted by securing the post in a bore in the trough.

It is essential that the height of the stake be no higher than the calling height so that the hunter's fingers holding the striker, will contact and rub or otherwise manipulate the striker on the upper surface of the sound-box at that height, typically no higher than about 2 feet, depending upon the height of the seat and the size of the hunter. To ensure that the inserted sound-box is securely held within the trough while it is in use, it is desirable to use a restraining means each end of which is anchored to pins or other anchoring means on opposed sides of the trough.

Accordingly, a hunter might choose a first stake which can be deployed at no calling height other than the only one he prefers when he is hunting a turkey, and purchase a stake which provides that height only. On the other hand, a hunter might prefer to use a stake which is adjustable in calling height. In which case he would choose a second stake which is adjustable and comprises an outer upper cylindrical strut which has telescopably disposed therewithin an inner lower strut the lower end of which is pointed so that it can be pushed into the ground. Such a second stake may have a safety feature in that, in the fully retracted position, the pointed end of the inner lower strut is withdrawn within the outer upper strut, and cannot pierce an errant limb.

BRIEF DESCRIPTION OF THE DRAWING

The foregoing invention will best be understood by reference to the following detailed description of the sound-box and stake assembly and of particular stake assemblies to be used in conjunction with the sound-box, accompanied by schematic illustrations in which like reference numerals refer to like elements, and in which.

DETAILED DESCRIPTION OF PREFERRED EMBODIMENTS

Though, as stated hereinabove, a sound-box may be either circular or elliptical in plan view, it is typically circular and will be described herebelow as being held in a trough provided with a generally semi-circular channel which closely conforms to and snugly embraces a sound-box with a correspondingly configured shape held within the channel.

Figure 1:
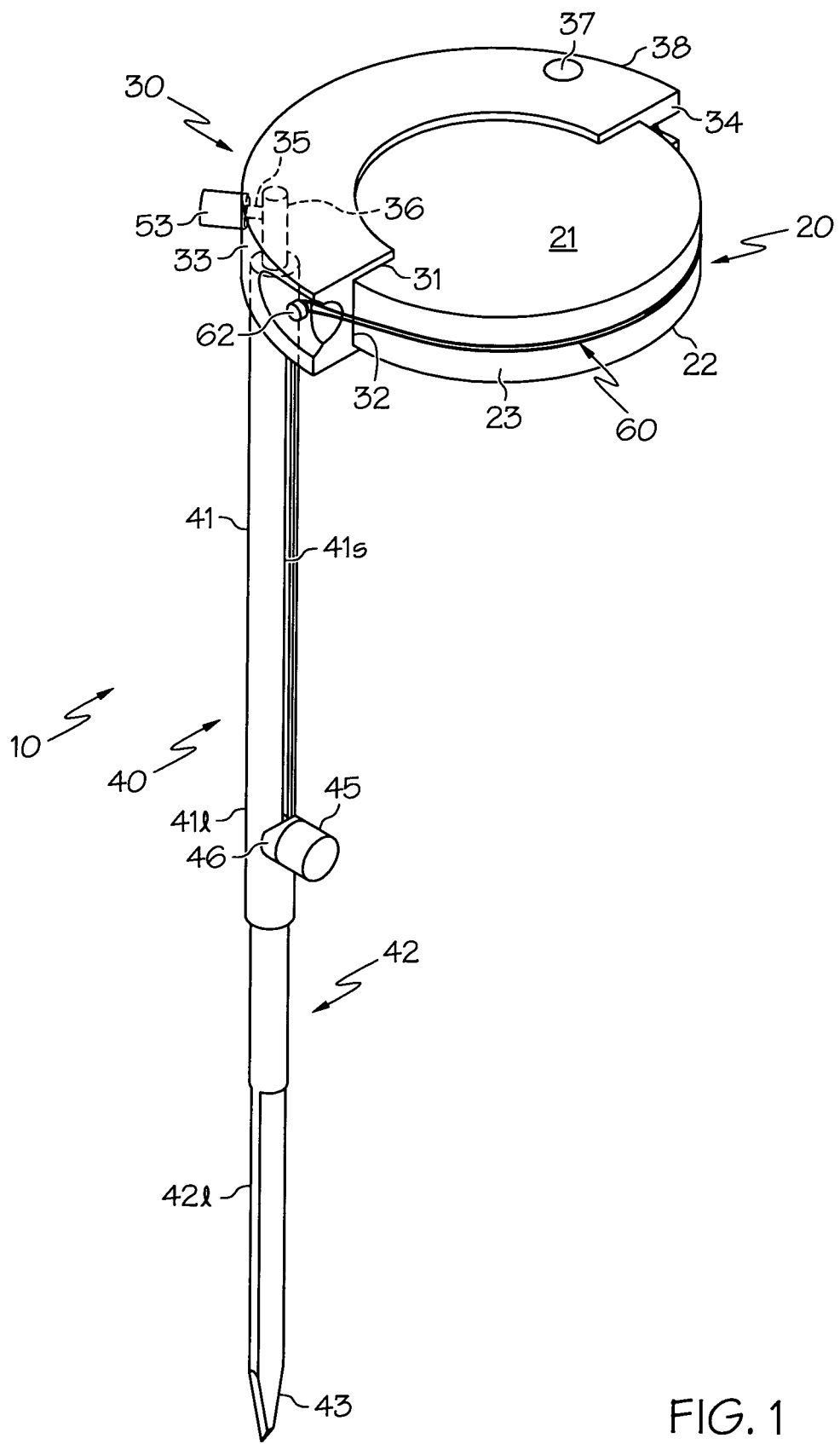
FIG. 1 is a perspective elevational view of a telescopable stake to which a crescent-shaped body or trough is removably secured; and a sound-box inserted and snugly secured within the crescent-shaped channel in the trough.
Figure 2:
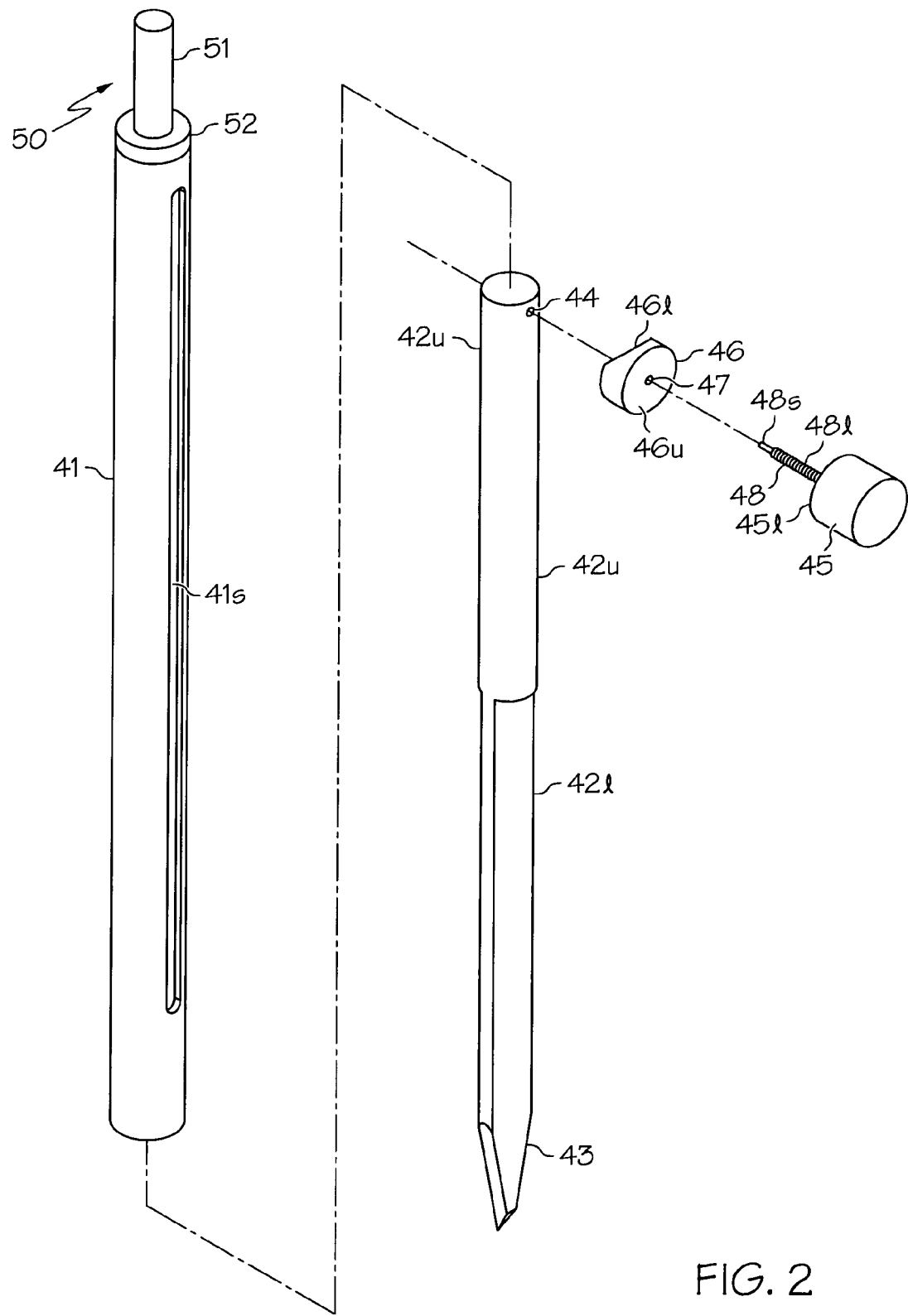
FIG. 2 is a perspective elevational view of disassembled upper and lower struts of the telescopable stake, showing the slotted side and details of how the lower inner strut may be fully retractable and held within the upper outer strut for safe handling; and, the lower inner strut may be adjustably extended so as to fit a particular chosen height requirement of a seated hunter.
Figure 3:
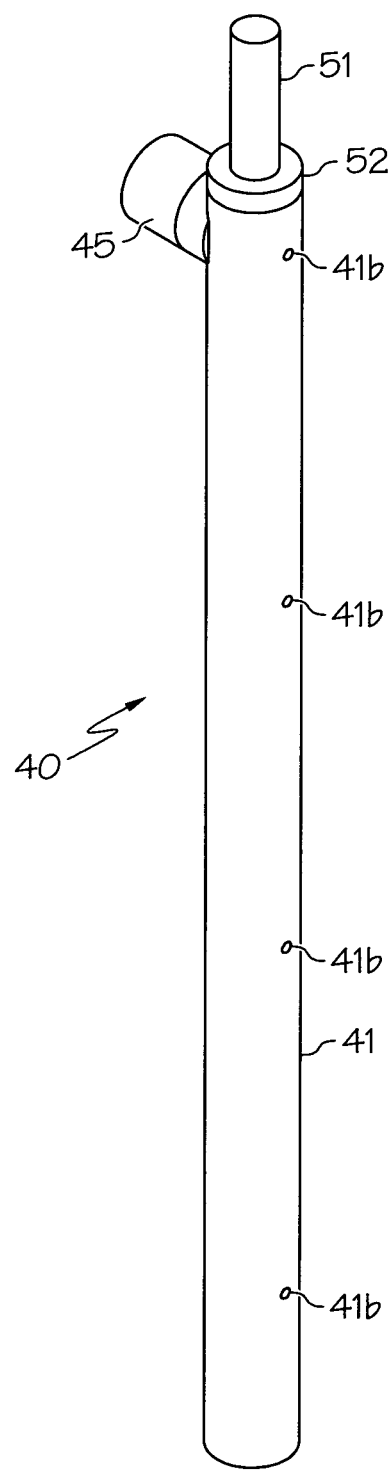
FIG. 3 is a perspective elevational view of the upper outer strut, showing the opposite side of the slot in the telescopable stake within which is telescoped the lower inner strut shown separately in FIG. 2.

Referring to FIGS. 1, 2 and 3, there is schematically illustrated a device of the present invention referred to generally by reference numeral 10, which device will be described as a telescopable stake 40 to which is removably secured a trough 30, in which, in turn, is secured a commonly used right-cylindrical sound-box 20, also referred to as a pot call. The sound-box is defined by an upper element 21, typically a circular plate of slate which may be perforated to produce a desired sound, and a lower circular element 22 (not visible) corresponding to the upper element 21, which together with a circumferential vertical wall 23, enclose a resonating space. The sound-box 20 having a wall 23 of height "h" is slidably inserted into and removably snugly secured in a channel 31 cut in a unitary semi-circularly shaped trough 30, having a width from 0.010" to 0.032" greater than "h". The sound-box 20 is removably secured atop the stake 40 which, in this first embodiment shown, is a telescopable strut. The trough 30 is preferably molded in a single shot, either of a rigid synthetic resinous material such as a polyamide, e.g. nylon, commercially available as DELRIN®, a polyolefin, e.g. polypropylene and the like, or from aluminum or other light metal alloy. The molded piece is then machined to provide the appropriate features described herein.

The channel 31 has a U-shaped cross-section and is cut in the entire arcuate length of the trough. The bottom 32 of the channel is inwardly spaced-apart from the circumferential outer surface 33 of the trough 30, the radius of the bottom 32 of the channel 31 being from about 0.020"-0.5" smaller than the radius of the outer surface 33, and concentric therewith. The smaller the radius of the bottom of the channel 31, the thicker the vertical wall 38 of the trough 30. It will be evident that, to save on material required to make the trough, it is desirable to have the thinnest wall which will provide adequate strength and other desired features in the trough.

The width of the U-shaped channel 31 is chosen so as to snugly, removably secure the largest cylindrical sound-box which the hunter might use, that is, having the greatest diameter, typically 4" (inches), and the greatest thickness or width, typically 0.625". Thus, the radius of the bottom 32 of the U-shaped channel 31 is slightly greater, typically from 0.005"-0.030" greater, than the 2" radius of that largest sound-box, and the width of the channel 31 is slightly greater, preferably from typically from 0.010"-0.020" greater, than the maximum width "h"=0.625 of that sound-box, so that the contours of the channel closely match those of that portion of the sound-box, typically about one-half, inserted in the channel.

This choice of channel dimensions is designed to receive a resilient pad 70 (see FIG. 4) functioning as a shim to snugly, removably secure a smaller sound-box 25 (see FIG. 4) in the trough, that is, having a smaller radius and lesser height than the corresponding dimensions for the largest sound-box for which the trough is designed. Such smaller sound-box may have either a smaller diameter or a lesser height, or both, than that of the largest sound-box. Any such smaller box can thus be secured in the trough to ensure the sound-box does not move when it is being stroked, rubbed or otherwise manipulated with the striker (not shown).

To ensure that the smaller sound-box remains snugly secured, a flexible restraining means 60 such as a piece of twine, but preferably a resilient synthetic resinous (plastic) strap of a polyolefin, or a rubber band, is provided on the outer surface body of the trough, preferably by having one end of the restraining means secured to a vertical pin 61 and the other to another pin 62 radially protruding from the surface of an arcuate surface 63 cut into the outer surface 33 of the trough.

In a first embodiment, the stake 40 includes telescoped upper and lower struts 41 and 42 respectively, the latter slidable inside the upper and preferably being solid for maximum strength. The lower end 42*l* of the lower inner strut 42 is provided with a pointed end 43 which is preferably flattened on at least one, preferably both sides, so as not to allow the stake 40 to be rotatable about its vertical axis when thrust into the ground. The lower inner strut 42 is slidably, fully retractable within the upper outer strut 41 so as to conceal the pointed end 43 for safety reasons. If desired, except for the upper portion 42*u* of the lower strut 42, near its uppermost end, which must be cylindrical and slidable within upper strut 41, the lower strut 42 may be entirely flat, that is a narrow laminar spike, the lower end of which is pointed.

The upper strut 41 is provided, in a longitudinally axial direction, over a majority of its length, with a slot 41*s* in which the threaded stem 48 is reciprocably, slidably movable, so as to adjust the calling height at which the stake 40 is to be deployed. At its upper end, the upper strut 41 is provided with a trough-mounting means 50 including a vertical mounting post 51 protruding axially from a collar 52 secured to the end of the upper strut 41.

The upper portion 42*u*, of the lower strut 42, is provided near its upper end with a threaded through-bore 44 into and through which threaded stem 48 of a first thumb screw 45 is threadedly received. The thumb screw 45 is preferably provided with a large cylindrical head to facilitate manually locking and unlocking the lower inner strut 42 within the upper outer strut 41 at any chosen position between fully retracted and fully extended in the lower portion 41*l* of the upper outer strut 41. To do so, the thumb screw 45 is provided with a cooperating contoured locking washer 46 provided with a through-bore 47 through which threaded stem 48 passes before it is threaded into the threaded through-bore 44. Near its end, the lower portion 48*l* of the threaded stem 48 is not threaded so as to provide a shoulder 48*s*. When the threaded stem 48 is inserted through the slot 41*s* and the thumb screw 45 is threadedly advanced through the threaded bore 44, the tip of the lower end 48*l* is forcefully biased against the inner surface of the upper strut 42 so that the upper end 42*u* of the inner strut 42 is effectively jacked against the inner wall of upper strut 41. When so extended, the strut 40 provides the height the hunter has chosen.

To stow the inner strut 42, it is retracted so that the lower portion 48*l* of the threaded screw 48 is aligned with the through-bore 41*b*, aligned directly behind the slot 41*s*, so that when the thumb screw 45 is tightened, threaded screw 48 is advanced through the upper portion 42*u* of the inner strut 42, lower end 48*l* enters the bore 41*b*, the shoulder 48*s* abuts the inner wall of the upper portion 42*u* of the upper strut 42, and the inner strut 42 is jacked against the inner wall of outer strut 41. The inner strut 42 is thus doubly, securely locked within the upper strut 41. The length of the screw 48*s* and the thickness of the washer 46 are chosen so that, when the inner strut 42 is stowed, the end 48*l* does not protrude through the wall of the upper strut 41.

The washer 46 is provided with a lower surface 46*l* having a radius matching that of the outer surface of the upper strut 41; and the upper surface 46*u* of the washer 46 is planar as is the lower surface 45*l* of the thumb screw.

As shown in FIG. 3, the outer strut is provided with at least two vertically aligned through-bores 41*b*, the upper through-bore to lock the lower inner strut 42 in the fully retracted position, and the lower through-bore to lock the inner strut in the fully extended position, if that is chosen to be the hunter's height requirement, for his comfort.

The calling height is adjustable to any extended position between the upper and lower through-bores 41*b* because, when the thumb screw 45 is tightened, the tip of the lower end 48*l* is forcefully biased against the inner wall of the upper strut 42*u* and inner strut 42 is locked at the desired calling height, against the inner wall of the upper strut 42. For doubly securing the height of the extended strut 40, at various predetermined, equally spaced-apart intervals (e.g. adjustability at one inch intervals), multiple, vertically aligned, through-bores 41*b* an inch apart may be provided in the outer strut. An outer strut 42, provided with such through-bores 41*b* would allow multiple choices of height for the stake 40 which could be extended in one inch increments.

Reverting to FIG. 1, the trough 30 is preferably provided with a radial slot 34 through which a first anchor pin 61 is vertically securely fixed (see FIG. 4) to anchor one end of the restraining means 60. A second anchor pin 62 is securely fixed at a point oppositely disposed from the first anchor pin 61, in the outer portion of the trough where it is contoured, the contoured surface serving to keep the restraining means conforming closely to the outer surface of the vertical wall 23 of the sound-box 20. The restraining means 60 may be a piece of string, or a flexible strap of synthetic resinous material ("plastic"), or a resilient strap or rubber band.

Trough 30 is also provided with a threaded radial bore 35 (shown in phantom outline) to receive a threaded stem of a second thumb screw 53. The threaded radial bore 35 communicates with an intersecting vertical bore 36 (shown with dotted lines in FIG. 4), the bore 36 being dimensioned to slidably, closely receive the mounting post 51 to minimize play of the sound-box in use. If the vertical circumferential wall of the trough is thick enough, the vertical bore 36 may be a through-bore, though as shown, it terminates just above the radial bore 35. When the mounting post 51 is inserted in the vertical bore 36, the trough 30 rests on the collar 52, and when thumb screw 53 is tightened against the mounting post 51, the sound-box 20 is firmly and securely held in the trough.

For additional convenience, and to minimize the sound that placing the striker (not shown) on the ground might create after the hunter has attracted the wild turkey to the patch, the trough 30 may include a vertical through-bore 37, again, provided there is enough material in the wall of the trough, the through-bore 37 having a diameter slightly greater than that of the striker inserted therein.

Referring further to FIG. 3, there is shown a view of the stake 40 in which the upper strut 41 is provided with multiple, vertically aligned and spaced-apart through-bores 41*b* to receive the lower end 48*l* of threaded stem 48 of the thumb screw 45, described hereinabove. As shown, in the fully retracted position, the threaded screw of the thumb screw 45 is inserted through washer 46 and advanced through through-bore 44 in the upper end 42u of the lower inner strut 42 (not visible), so that lower end 48l is slidably secured in uppermost through-bore 41b.

To deploy the inner lower strut 42 at a height determined by an intermediate through-bore 41b, the thumb screw 45 is, in a manner analogous to that for the prior positions, tightened to advance stem 48 through through-bore 44 and lower end 48l into a chosen intermediate through-bore 41b directly below and vertically aligned with uppermost through-bore 41b. In this manner, the calling height at which the sound-box is presented to the fingers of the hunter can be adjusted to any chosen height between a fully extended highest position and another lowest position of use.

Figure 4:
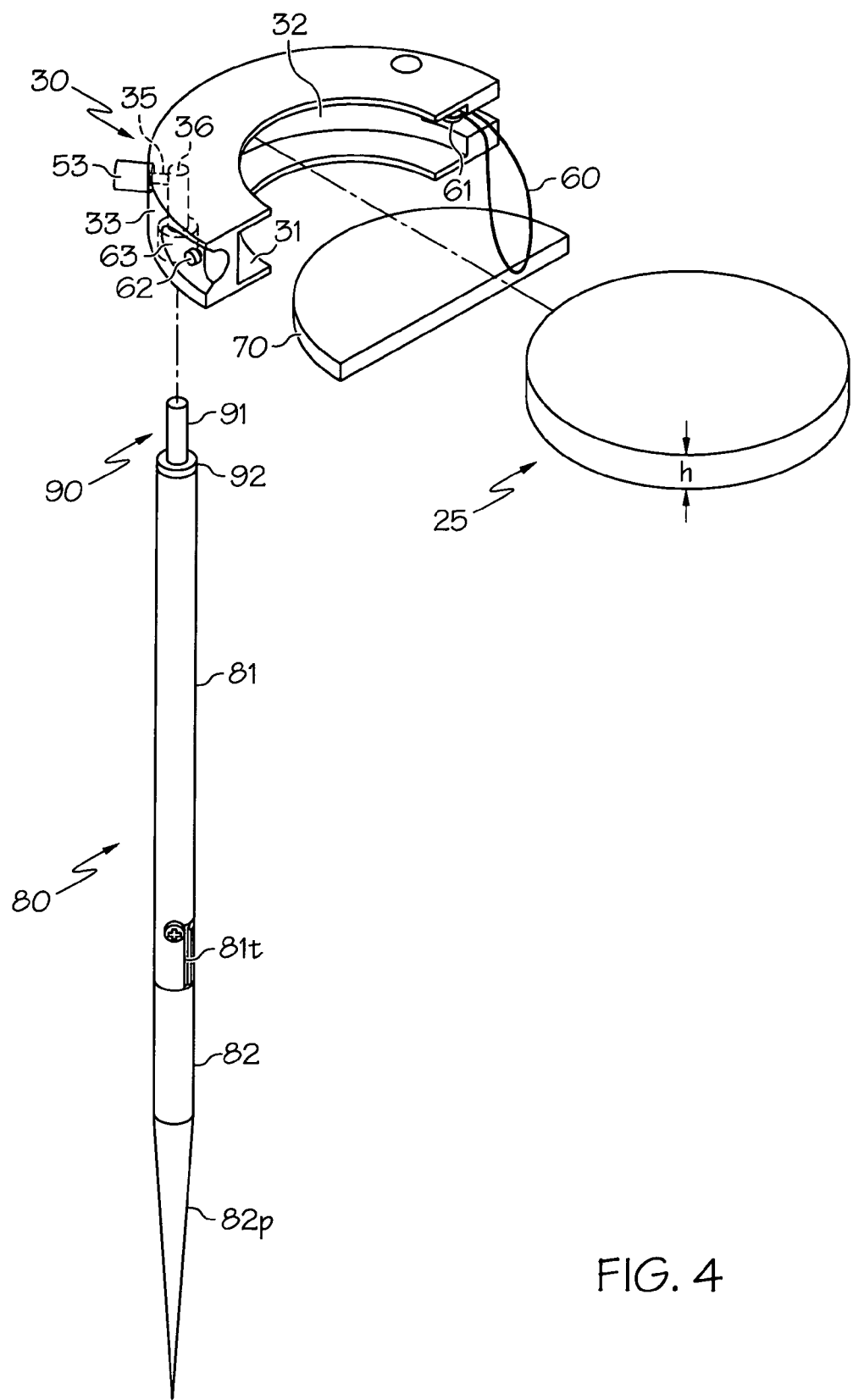
FIG. 4 is an exploded perspective elevational view of another non-telescopable embodiment of the stake in which the lower inner strut is non-adjustably deployed, and its position securely fixed within the upper outer strut; the sound-box is shown before it is secured in the crescent shaped channel of the trough, optionally having a resilient pad functioning as a shim to bias the sound-box against one of the adjacent inner surfaces of the trough's walls; and the crescent-shaped trough is shown before it is secured to a mounting post atop the upper outer strut.
Figure 5:
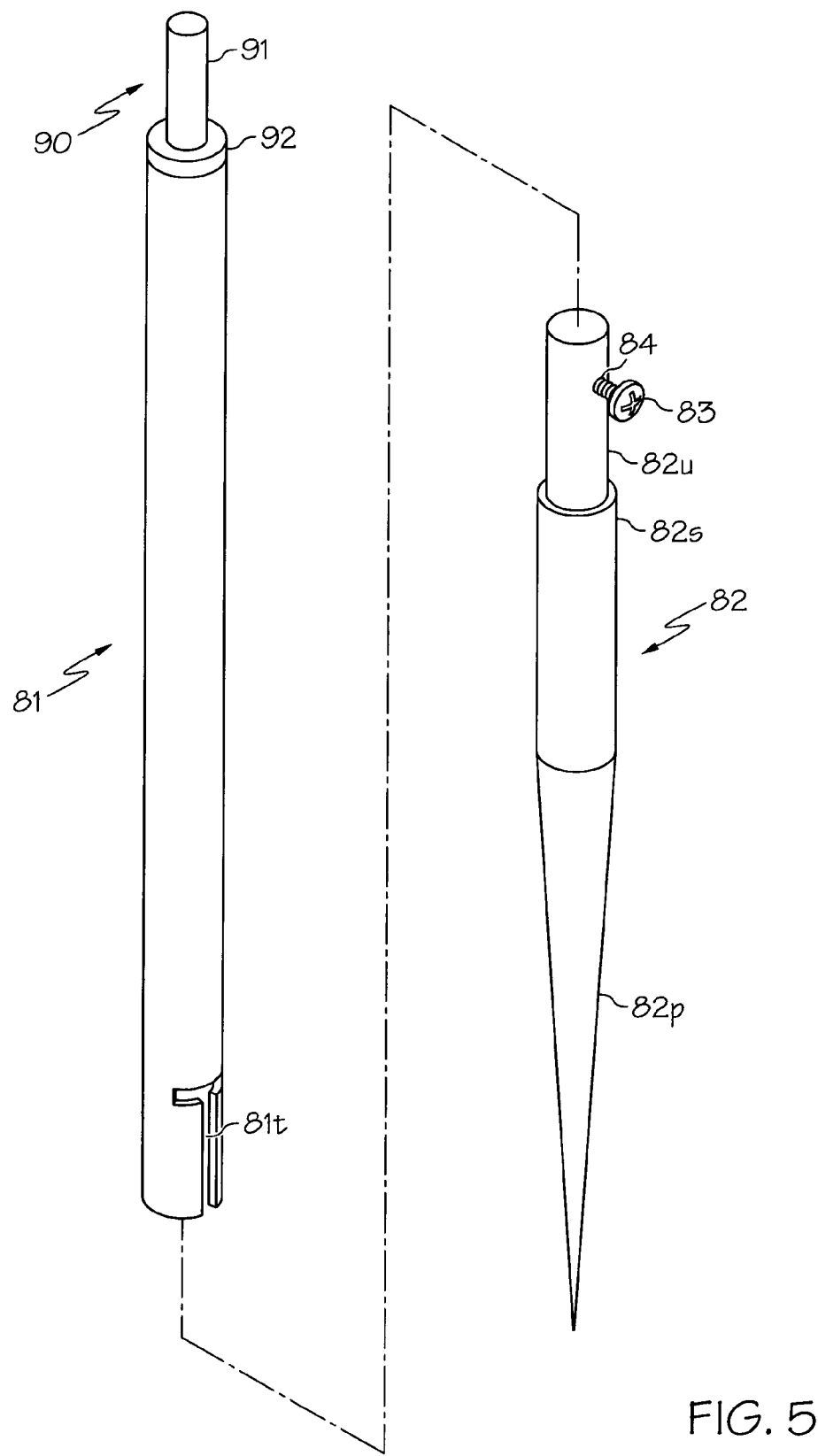
FIG. 5 is a perspective elevational view of upper and lower struts of the non-adjustable non-telescopable stake, showing details of how the inner lower strut may be partially inserted within and held in the outer upper strut.

Since a hunter typically prefers a particular seated position only, there is shown in FIGS. 4 and 5 a second embodiment of a non-adjustable stake 80 which is deployable at a chosen calling height only, which height is determined by the seated position chosen by the hunter. Assembled as shown, the stake presents trough 30 at the chosen calling height. The trough 30 is the same as that shown in FIGS. 1-3, and, as before it is removably mounted on a stake 80 which comprises an upper strut 81 and a lower strut 82 which is detachable from the upper strut 81. For use, the stake 80 can only be deployed as an assembly in a fully extended form, then disassembled for transport or storage. The outer upper strut 81 may be a solid cylinder or tubular. Its upper end is provided with a mounting means 90 including a mounting post 91 protruding vertically axially. Preferably, as before, the upper strut 81 is tubular and is fitted with a collar 92 through which mounting post 91 protrudes vertically axially. The mounting post 51 is inserted into vertical through-bore 36 in trough 30 and the thumb screw 53 is tightened to lock the mounting post 81 in the trough 30. The lower end of the upper outer strut 81 is tubular and provided with a T-slot 81t.

The lower strut 82 is preferably a solid cylinder the lower end of which terminates in a pointed end 82p. As in the previous embodiment of the stake, the lower end may be rectangular, ending with a sharply pointed tip to prevent rotation of the stake when the pot call 25 is being used. The upper end 82u of the lower strut is slidably insertable into the lower end of upper strut 81. As shown, upper end 82u has a diameter sufficiently smaller than that of the mid-portion of the lower strut 82 so as to provide a shoulder 82s upon which the lower end of the upper strut 81 is biased. To lock the inner strut in the upper strut, upper end 82u is provided with a screw 83 threaded into 82u and projecting laterally. The threaded stem 84 of the screw 83 is slidably insertable into the T-slot 81t so that when the lower strut 81 is rotated, the stem 84 is held in an arm of the T-slot 81t. If the screw 83 is tightened, the lower strut 82 is securely held in the extended position.

Having thus provided a general discussion, described the stake-mounted pot call holder in detail and illustrated the invention with a specific example of the best mode of making and using the device, it will be evident that the invention has provided an effective solution to an age-old problem. It is therefore to be understood that no undue restrictions are to be imposed on the embodiments illustrated, and that the invention is not restricted to a slavish adherence to the details set forth herein.

What is claimed is:

1. A device for holding a sound-box of a pot call for a wild turkey being called by a hunter manipulating a striker on the surface of the sound-box while in a sitting position waiting for arrival of the turkey to a selected portion of ground, the device comprising, a unitary trough in which the sound-box is held in a generally horizontal position, at a chosen calling height no higher than the hunter's fingers, when mounted atop a stake having an upstanding mounting post projecting axially vertically, upon which post the trough is removably mounted by securing the top of the post in a bore in the trough, the trough having a generally semicircular configuration within which is formed a U-shaped coaxial channel extending over the entire arcuate length of the trough and having a width sufficient to snugly removably hold the sound-box which is inserted laterally into the channel, the stake comprising an upper strut and a lower strut detachable from the upper strut, the lower end of the lower strut having a pointed end adapted to be pushed into the ground.

2. The device of claim 1 wherein the lower strut's lower end is flattened and its pointed end when pushed into the ground holds the stake non-rotatably about the vertical axis.

3. The device of claim 1 wherein the trough, near each end thereof, is provided with anchoring means to anchor each end of a restraining means extending over the peripheral vertical surface of the sound-box inserted therein, and adapted to secure and bias the sound-box against the channel's surfaces.

4. The device of claim 1 wherein the lower strut is telescopably fully retractable within the upper strut and adjustably extendible and secured to provide a chosen calling height.

5. The device of claim 2 wherein the lower strut's upper end is insertable in the upper strut's lower end and secured therein.

6. The device of claim 1 wherein the sound-box has a radius smaller than that of the channel.

7. The device of claim 1 wherein the sound-box has a height smaller than that of the channel, and the sound-box is secured therein with a resilient pad inserted between the sound-box and one of the trough's adjacent walls.

8. The device of claim 1 wherein the sound-box is securely held within the channel of the trough with a flexible restraining means, opposed ends of which are secured to anchoring means on opposed sides of the outer circumference of the trough.

\* \* \* \* \*